US012646528B2

(12) United States Patent
Brownlee et al.

(10) Patent No.: US 12,646,528 B2
(45) Date of Patent: Jun. 2, 2026

(54) SYSTEM AND METHOD FOR IDENTIFYING SENTIMENT (EMOTIONS) IN A SPEECH AUDIO INPUT

(71) Applicant: Valence Vibrations, Inc., Los Angeles, CA (US)

(72) Inventors: Shannon Modine Brownlee, Carlsbad, CA (US); Chloe Jordan Duckworth, San Jose, CA (US)

( * ) Notice: Subject to any disclaimer, the term of this patent is extended or adjusted under 35 U.S.C. 154(b) by 0 days.

(21) Appl. No.: 17/831,416

(22) Filed: Jun. 2, 2022

(65) Prior Publication Data

US 2022/0392485 A1 Dec. 8, 2022

Related U.S. Application Data

(60) Provisional application No. 63/196,264, filed on Jun. 3, 2021.

(51) Int. Cl.
| | |
|---|---|
| *G10L 25/63* | (2013.01) |
| *G10L 15/16* | (2006.01) |
| *G10L 21/10* | (2013.01) |
| *G10L 25/24* | (2013.01) |
| *G10L 25/30* | (2013.01) |

(52) U.S. Cl.
CPC .............. *G10L 25/63* (2013.01); *G10L 15/16* (2013.01); *G10L 21/10* (2013.01); *G10L 25/24* (2013.01); *G10L 25/30* (2013.01)

(58) Field of Classification Search
CPC ......... G10L 25/63; G10L 15/16; G10L 21/10; G10L 25/24; G10L 25/30
See application file for complete search history.

(56) References Cited

U.S. PATENT DOCUMENTS

| | | | |
|---|---|---|---|
| 6,691,090 B1* | 2/2004 | Laurila | ................... G10L 15/02 |
| | | | 704/250 |
| 11,495,215 B1 | 11/2022 | Wu | |
| 11,501,794 B1 | 11/2022 | Kim | |
| 11,854,538 B1* | 12/2023 | Rozgic | .................... G10L 25/63 |
| 2001/0056349 A1* | 12/2001 | St. John | .................. G07C 9/37 |
| | | | 704/270 |
| 2002/0194002 A1* | 12/2002 | Petrushin | ................ G10L 17/26 |
| | | | 704/E17.002 |
| 2016/0217807 A1* | 7/2016 | Gainsboro | ............ H04M 3/568 |

(Continued)

OTHER PUBLICATIONS

V. Fernandes, L. Mascarehnas, C. Mendonca, A. Johnson and R. Mishra, "Speech Emotion Recognition using Mel Frequency Cepstral Coefficient and SVM Classifier," 2018 International Conference on System Modeling & Advancement in Research Trends (SMART), Moradabad, India, 2018, pp. 200-204 (Year: 2018).*

(Continued)

*Primary Examiner* — Pierre Louis Desir
*Assistant Examiner* — Daniel W Chung
(74) *Attorney, Agent, or Firm* — Inventors Assistance Foundation; Jurgen Klaus Vollrath

(57) ABSTRACT

In a system and method for enabling a user to identify the emotions of speakers during a telephone or online conversation, spoken audio input is pre-processed using a one-dimensional Mel Spectrogram and/or a two-dimensional Mel-Frequency Cepstral Coefficient (MFCC) matrix, reducing the two-dimensional matrix to a single dimension output, and identifying at least one emotion in the audio input using a convolutional or recurrent neural network.

13 Claims, 11 Drawing Sheets

(56) References Cited

U.S. PATENT DOCUMENTS

| | | | | |
|---|---|---|---|---|
| 2018/0322863 | A1* | 11/2018 | Bocklet | G10L 19/008 |
| 2020/0035222 | A1* | 1/2020 | Sypniewski | G10L 15/16 |
| 2020/0075039 | A1 | 3/2020 | Eleftheriou | |
| 2022/0076693 | A1* | 3/2022 | Bui | G06F 17/16 |
| 2022/0084543 | A1* | 3/2022 | Sinha | G06N 3/09 |

OTHER PUBLICATIONS

Fernandez et al., "Speeh Emotion Recognition using el Frequency Cepstral Coefficient and SVM Classsifier," 2018 International Conference on System Modeling & Advancement in Research Trends (SMART), Moradabad, India, 2018, pp. 200-204, dol: 10.1109/ SYSMART.2018.8746939 (2018).
S.K. Pandey, H.S. Shekhawat and S.R.M. Prasanna, "Deep Learning Techniques for Speech Emotion Recognition A Review," 2019 29th International Conference Radio Elektronika (RADIOELEKTRONIKA), Pardubice, Czech Republic, 2019, pp. 1-6 (Year: 2019).

* cited by examiner

FIGURE 5

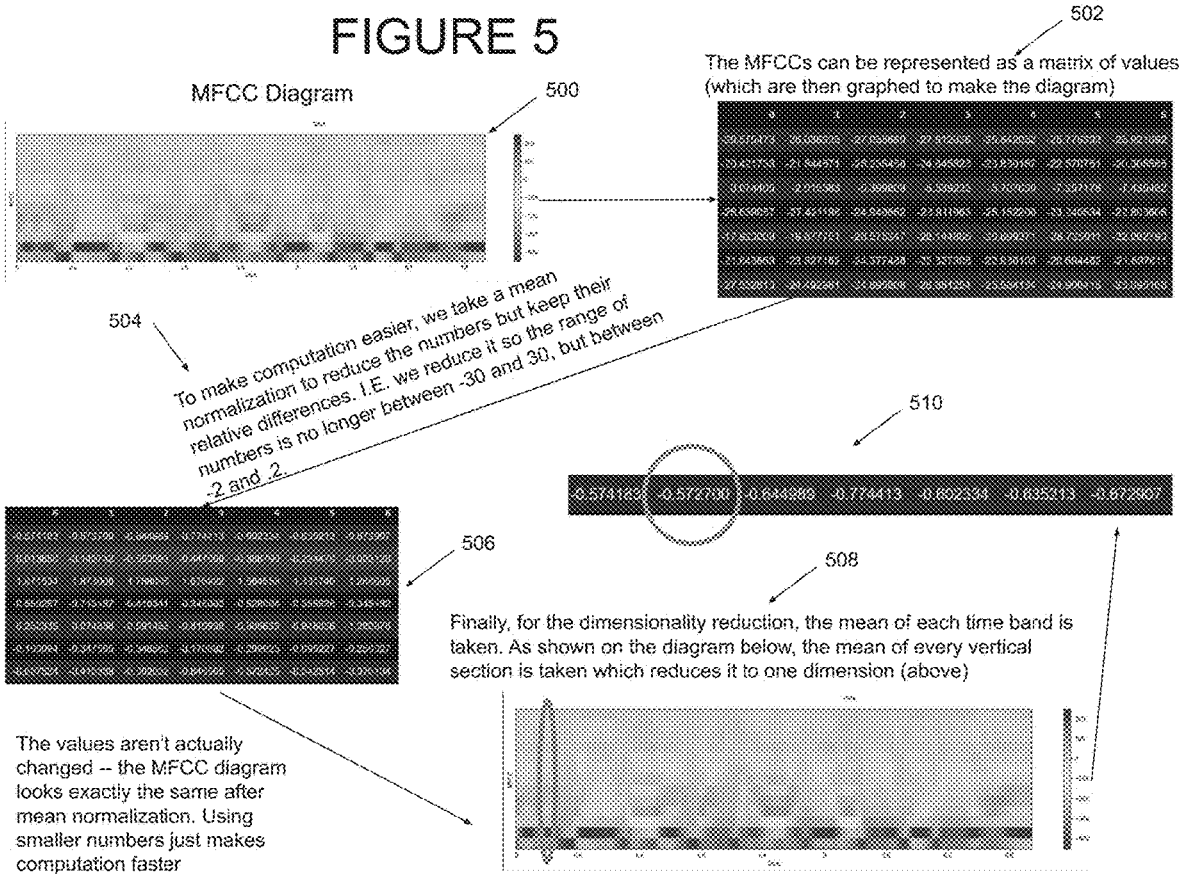

MFCC Diagram                                        500

502

The MFCCs can be represented as a matrix of values
(which are then graphed to make the diagram)

504

To make computation easier, we take a mean
normalization to reduce the numbers but keep their
relative differences. I.E. we reduce it so the range of
numbers is no longer between -30 and 30, but between
-2 and 2

510

506

508

Finally, for the dimensionality reduction, the mean of each time band is
taken. As shown on the diagram below, the mean of every vertical
section is taken which reduces it to one dimension (above)

The values aren't actually
changed -- the MFCC diagram
looks exactly the same after
mean normalization. Using
smaller numbers just makes
computation faster Waveplot                                                          710

MFCC
spectogram                                                       700

SYSTEM AND METHOD FOR IDENTIFYING SENTIMENT (EMOTIONS) IN A SPEECH AUDIO INPUT

FIELD OF THE INVENTION

The present invention relates to voice recognition. In particular, it relates to identifying emotional content in speech.

BACKGROUND OF THE DISCLOSURE

Current state-of-the-art emotion detectors suffer from inadequate accuracy for identifying the most dominant emotion from four or more different emotions. Furthermore, since extraction of emotional content from speech relies on speech recognition, a problem for emotional speech processing is the limited functionality of speech recognition systems. Historically, the two most common algorithms in speech recognition systems are Dynamic Time Warping (DTW) and Hidden Markov Models (HMMs). DTW is an approach that was historically used for speech recognition but has now been largely displaced by the more successful HMM approach. HMMs are statistical models which output a sequence of symbols or quantities. They are popular in speech recognition because they can be trained automatically and are simple and computationally feasible to use. Modern speech recognition systems use various combinations of a number of standard techniques in order to improve results over the basic approach of HMMs, including Mel Spectrograms and Mel-Frequency Cepstral Coefficients (MFCCs), which are derived from Mel Spectrograms.

A Mel-Frequency Cepstrum (MFC) is a representation of the short-term power spectrum of sound, based on a linear cosine transform of a log power spectrum on a nonlinear Mel scale of frequency. Mel-Frequency cepstral coefficients (MFCCs) are coefficients that collectively make up an MFC. The MFC is based on the Mel Spectrogram, which is a graph of frequency and time over the log-scale of the amplitude of an audio file. In the MFC, the frequency bands are equally spaced on the Mel scale, which approximates the human auditory system's response more closely than the linearly spaced frequency bands used in the normal spectrum. This frequency warping can allow for better representation of sound, for example, in audio compression. Thus, MFCCs are commonly used features in speech recognition systems, such as systems which can automatically recognize numbers spoken into a telephone. When it comes to emotional content, emotion classification models, such as those that utilize MFCCs or the transforms that are used to derive MFCCs, can also help people of different neurotypes (autism, ADHD, alexithymia, etc), cultures, primary languages, and communication styles empathize with each other through shared emotional understanding.

According to Milton's theory of double empathy, autistic people struggle to interpret the emotions of allistic/non-autistic people, just as allistic/non-autistic people struggle to interpret the emotions of autistic people because their emotional communication styles are different. This problem can be broadened to include people of different cultures, neurotypes, primary languages, and many other demographics which affect communication style. In addition, people with alexithymia specifically struggle to interpret their own emotions and those of other people. A reliable and accurate tool for emotional speech processing could help people identify the emotions of themselves and other people in real-time conversation and connect with others with shared emotional understanding.

Thus, while general emotion recognition concepts are known, there are still issues with emotional speech processing's poor accuracy of detecting the correct emotion and insufficient processing capability. Poor accuracy and insufficient processing capability are grave problems because they make a potentially life-altering technology (emotional speech processing) unreliable and functionally impractical. Therefore, improvements to both the accuracy and processing capability of emotional speech processing are needed to make the technology more reliable and practical, as well as to provide real-time emotional feedback so that a user can feel and interpret the emotional valence of themself and/or others with whom they are speaking in an audio or audiovisual communication environment.

Accordingly, a need remains for a system, method, and computer program product (software/algorithm/model) that analyzes a voice/speech input to identify emotions in order to overcome at least one of the above-noted shortcomings.

SUMMARY OF THE INVENTION

Exemplary embodiment(s) of the present disclosure relate to speech recognition software and, more particularly, to a specially configured system, method, and computer program product (software/algorithm/model) that analyzes a voice/speech input to identify emotions and generate an associated output. The output may comprise graphic feedback on a screen of a user communication device, such as a smart phone or laptop, e.g., a laptop configured to engage in an online conference call such as a Zoom call.

BRIEF DESCRIPTION OF THE DRAWINGS

FIG. 5 is a series of diagrams illustrating the pre-processing stage of one embodiment of the present invention;

DETAILED DESCRIPTION OF THE DISCLOSURE

Figure 1:
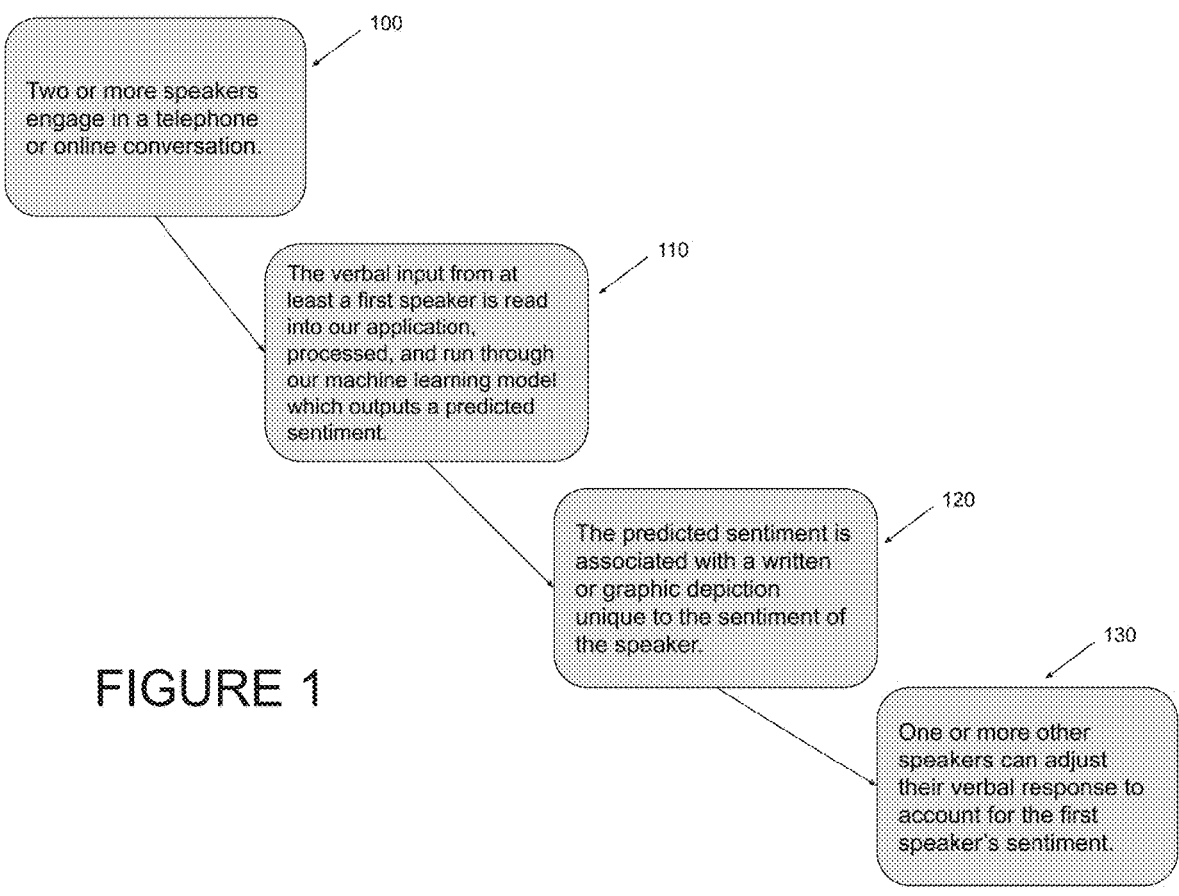
FIG. 1 is a block diagram of the logic steps involved in one embodiment of an implementation of the invention.

The novel features believed to be characteristic of the exemplary embodiment(s) are set forth with particularity in the appended claims. The disclosure itself, however, both as to its organization and method of operation, together with further objects and advantages thereof, may best be understood by reference to the following description taken in connection with the accompanying drawings.

The non-limiting exemplary embodiment(s) will now be described more fully hereinafter with reference to the accompanying drawings, in which a preferred embodiment of the disclosure is shown. Such exemplary embodiment(s) may, however, be embodied in many different forms and should not be construed as limited to the embodiment set forth herein. Rather, these embodiment(s) are provided so that this application will be thorough and complete, and will fully convey the true scope of the disclosure to those skilled in the art.

The below disclosed subject matter is to be considered illustrative, and not restrictive, and any appended claim(s) are intended to cover all such modifications, enhancements, and other embodiment(s) which fall within the true scope of the non-limiting exemplary embodiment(s). Thus, to the maximum extent allowed by law, the scope of the non-limiting exemplary embodiment(s) is to be determined by the broadest permissible interpretation of the claim(s) and their equivalents, and shall not be restricted or limited by the foregoing detailed description.

References in the specification to "an exemplary embodiment", "an embodiment", "a preferred embodiment", "an alternative embodiment" and similar phrases mean that a particular feature, structure, or characteristic described in connection with the embodiment(s) is included in at least an embodiment of the disclosure. The appearances of the phrase "a non-limiting exemplary embodiment" in various places in the specification are not necessarily all meant to refer to the same embodiment.

The non-limiting exemplary embodiments of the present disclosure discussed with respect to FIGS. 1-9 are intended to provide a specially configured system, method, and computer program product (software/algorithm/model) that analyzes voice/speech input of speakers engaged in a telephone or online conversation so the speakers can interpret the emotions of their own voice and of the person(s) with whom they are speaking. It should be understood that the exemplary embodiment(s) may be used to recognize a variety of emotions associated with different languages, and should not be limited to any particular language or emotion described herein.

As a broad overview, the implementations discussed below with respect to FIGS. 1-9, make use of proprietary software that pre-processes audio data and uses machine learning to detect the emotions expressed in the speech of one or more speakers engaged in a telephone or online conversation and present speakers with visual feedback (e.g., written description or graphic image depicting the emotion of each speaker. A machine learning model analyzes the pitch changes in the speech as defined by the pre-processing stage, and determines the emotion being expressed, enabling people to identify the emotional valence of those to whom they speak based on the emotional content in the speech, which, in the case of a video call may be supplemented with emotional content as extracted from the facial features and/or body language of the speaker.

Advantageously, the present disclosure interfaces speech emotion signals with a screen of a user interface to express emotions as written feedback or in terms of icons or graphic images that are illustrative of the emotion. As mentioned above, while the present embodiments describe specifically speech analysis to extract emotional content, it will be appreciated that this may be augmented with facial and body imaging content using computer vision to corroborate the emotional analysis obtained from the voice sample. The structure, data, and classification of the speech's emotion has been altered significantly over the prior art. The neural network contains a unique architecture, wherein the training data frame contains different classes along with Mel Spectrum and/or MFCC values. The classes of the data frame include the emotions which our model is classifying, along with other signal information such as silence and noises to identify non-speech that will not include emotion information. In one embodiment the model classified the emotions: happy, sad, fearful, disgusted, angry, surprise, and neutral. The Mel Spectrum and/or MFCC values are the data that the neural network uses to find patterns that can be used to identify each class in this embodiment; these are included in the data frame alongside the classes.

Referring to FIG. 1, in a non-limiting exemplary embodiment, the speech analysis includes capturing a speech sample (Step 100) as part of a telephone or online conversation between two or more people; pre-processing the speech sample and then identifying emotional content using machine learning (Step 110) to define an emotional output signal associated with the emotive content of the speaker's speech sample. The emotional output signal is converted into a written description of the emotional content or a graphic depiction unique to the one or more emotional elements identified in the speech sample (Step 130). The proprietary data pre-processing pipeline and machine learning model will be described in greater detail below. In one embodiment the pre-processing stage together with the machine learning model analyze the pitch changes in a person's speech and determines the emotion being expressed. In the present embodiment, a visual depiction is provided of the emotion being expressed (also referred to herein as the sentiment), enabling the other speakers to identify the emotional valence of their own voice and of other people they are conversing with, thereby allowing the speakers to strengthen relationships with each other through shared emotional understanding.

Figure 2:
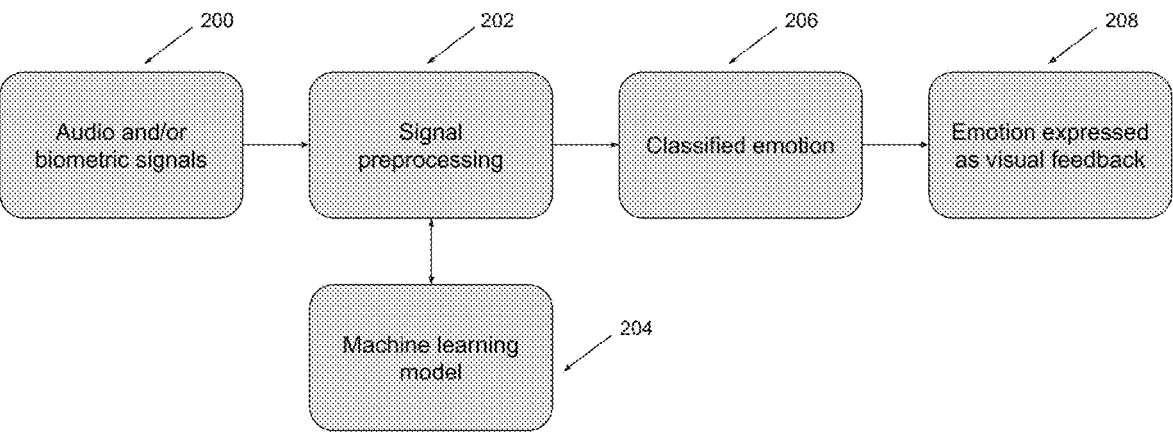
FIG. 2 is block diagram of the logic steps involved in one generic embodiment of an emotion detector system of the invention.

As shown in FIG. 2, audio input or biometric signal input 200 (e.g., facial expression, body language etc.) or a combination thereof is fed into a signal processor where it is pre-processed prior to being fed into the machine learning model (step 202). A machine learning model is invoked in step 204 to identify the emotional parameters in the input signal. The machine learning model classifies the predominant emotions in step 206 whereafter the emotion is converted into a visual feedback (step 208), e.g., by providing a written description or graphic depiction on a display screen of the communication device (e.g., smart phone, laptop, etc.)

Figure 3:
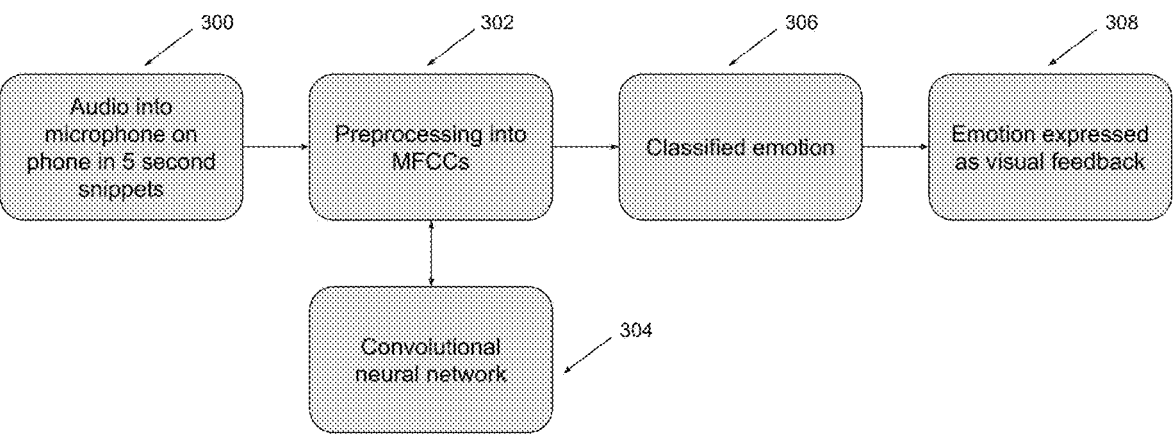
FIG. 3 is a block diagram of the logic steps involved in a specific implementation of the generic embodiment of FIG. 2.

FIG. 3 shows a more specific implementation of the generic logic flow of FIG. 2. The audio input or biometric signal input 300 is captured in short snippets, e.g., 3 to 20 second snippets and fed into a signal pre-processing function which in this case comprises an MFCC (step 302). The pre-processing function extracts pitch changes in the audio snippets. The machine learning model 304, which takes the form of a convolutional neural network, uses the average pitch changes to identify the emotional parameters in the input signal. In another embodiment, the machine-learning model used was a recurrent neural network. As in the generic discussion of FIG. 2, the machine learning model in this case classifies the predominant emotions in step 306 whereafter the emotion is translated into visual feedback (step 308) on a display screen.

Figure 4:
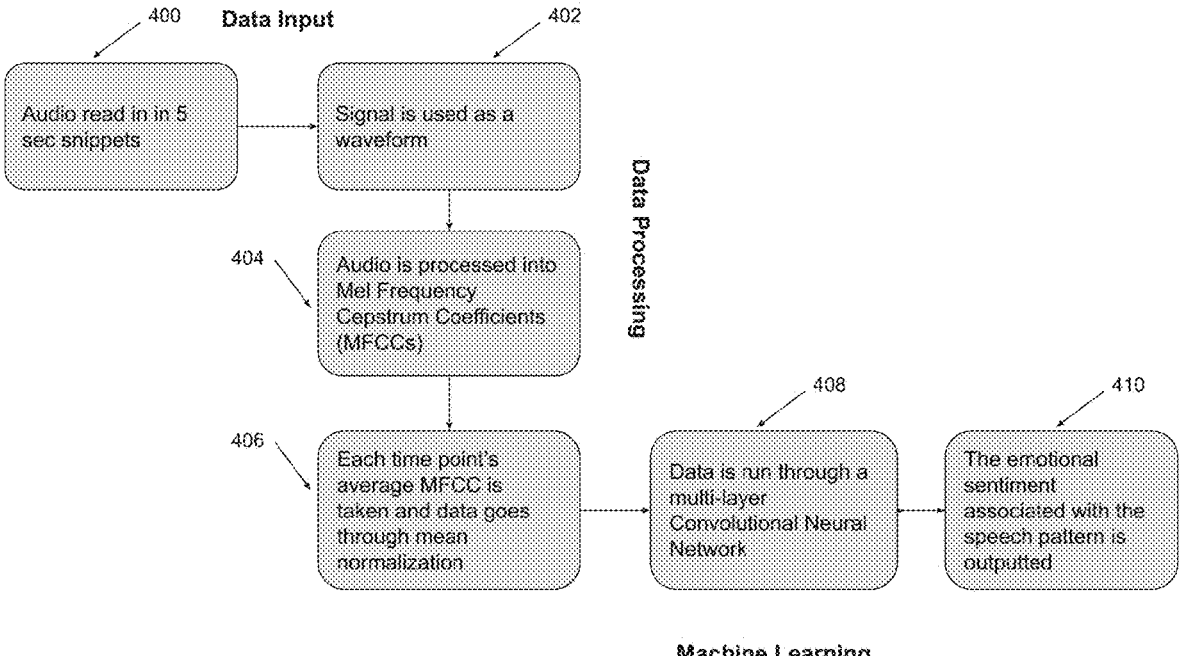
FIG. 4 shows a more detailed diagram of the logic steps involved in one embodiment of an implementation of the invention.

The pre-processing and neural network of FIG. 3 are further defined in FIG. 4, where the audio snippets (Step 400) constitute waveforms (Step 402), the digital versions of which are processed in Step 404 to define MFCCs. It will be appreciated that since MFCCs are derived from Mel Spectrograms, at each time point the average Mel spectral value or MFCC value is taken and then goes through mean normalization (Step 406), before being run through the neural network (Step 408) to extract the emotional content in the speech pattern (Step 410).

The pre-processing step involves processing a time series of the spoken audio input by transforming the time series into a one-dimensional Mel Spectrogram, or a two-dimensional Mel-Frequency Cepstral Coefficient (MFCC) matrix, which is then reduced back to a single-dimension output by means of mean normalization or other dimensionality reduction, before feeding the single dimensional output into the neural network to identify at least one emotion in the audio input. This is illustrated and discussed below with respect to FIG. 5.

Thus, one embodiment of the present disclosure provides, among other things, a system and method for recognizing sentiment from a spoken audio input signal. It provides, among other things, a computerized method for recognizing one or more emotions from the spoken audio input signal. This computerized method includes using a computer to extract exemplary features from the spoken audio input signal, wherein the method includes using a pre-processing stage involving Mel Spectrograms.

The Mel Spectrum value at each time point goes through mean normalization and is then passed through a multi-layered recurrent neural network as discussed above, or through a one-dimensional convolutional neural network, where the sentiments associated with the spoken audio input signal are learned during the training phase, and subsequently applied to new audio to select the emotion during runtime.

The present disclosure also provides, among other things, a system, wherein the system includes a computer program product (software) for execution on a computer or mobile device, which may also be implemented as a non-transitory, computer readable medium for recognizing one or more emotions from the spoken audio input signal, the computer readable medium having program code stored therein that when executed is configured to use a computer to extract exemplary features from the spoken audio input signal, wherein the logic of the software includes a Mel Spectrogram and/or Mel-Frequency Cepstral Coefficient (MFCC), and includes a mean normalization step, the system further including a computer configured to define a recurrent or convolutional neural network, which is used to assign at least one sentiment value to the spoken audio input signal based on a first comparison to training data.

In the present implementation of the invention the sentiment value output is communicated as an output signal to a user interface (e.g., computer or cell phone screen) to provide visual feedback associated with the sentiment value.

Figure 6A:
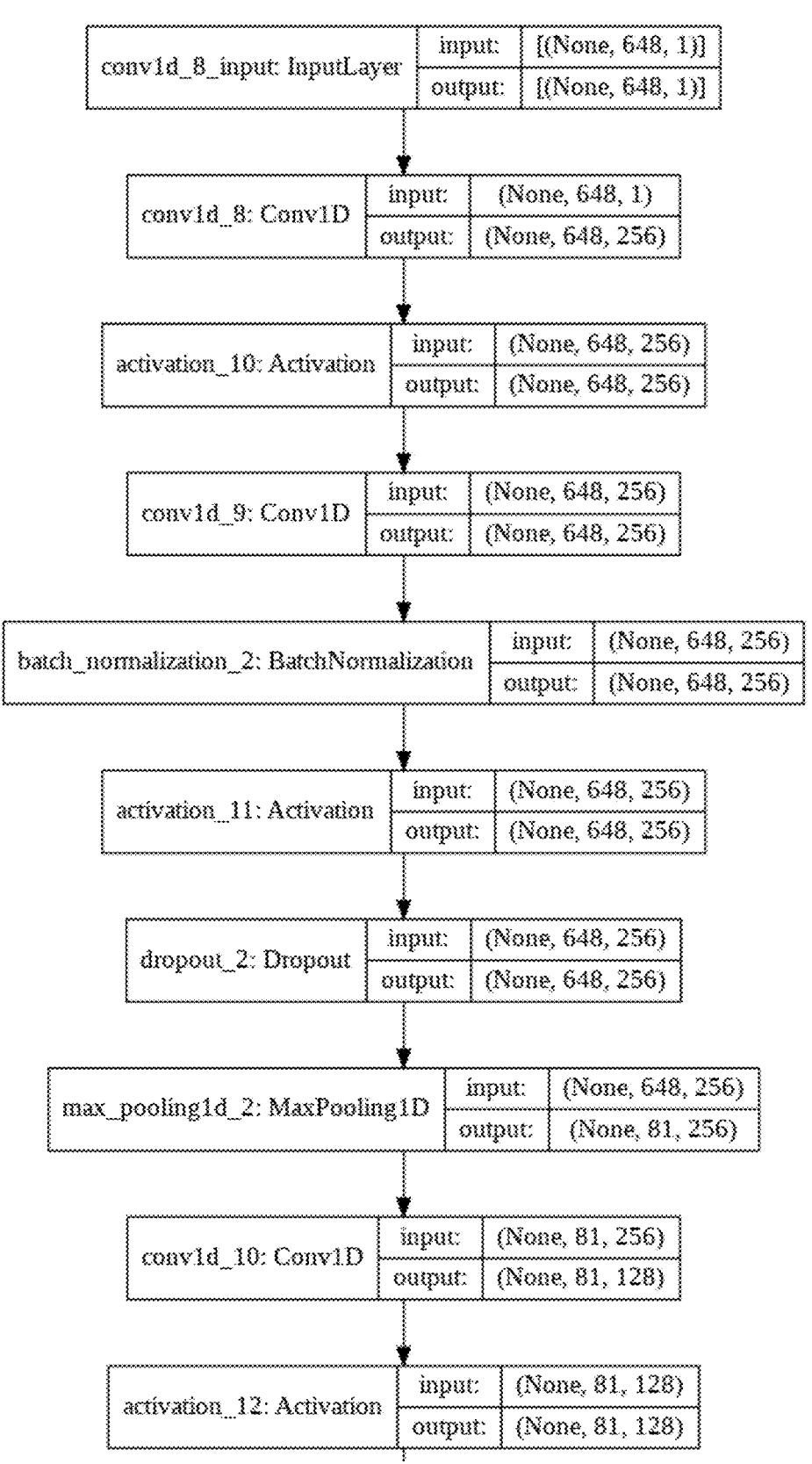
FIG. 6 shows one embodiment of the neural network architecture including the machine learning model built into the product.
Figure 6B:
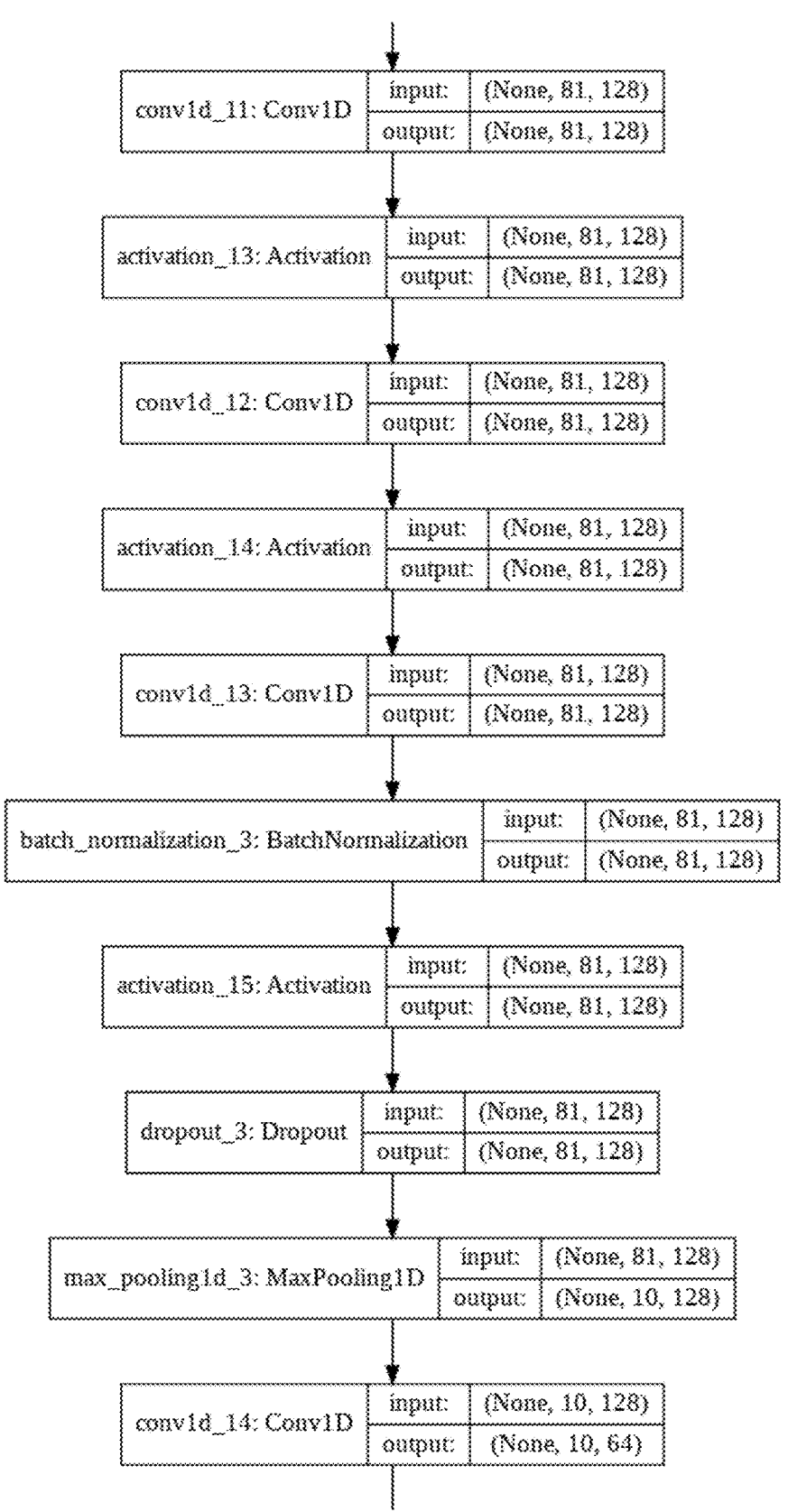
Figure 6C:
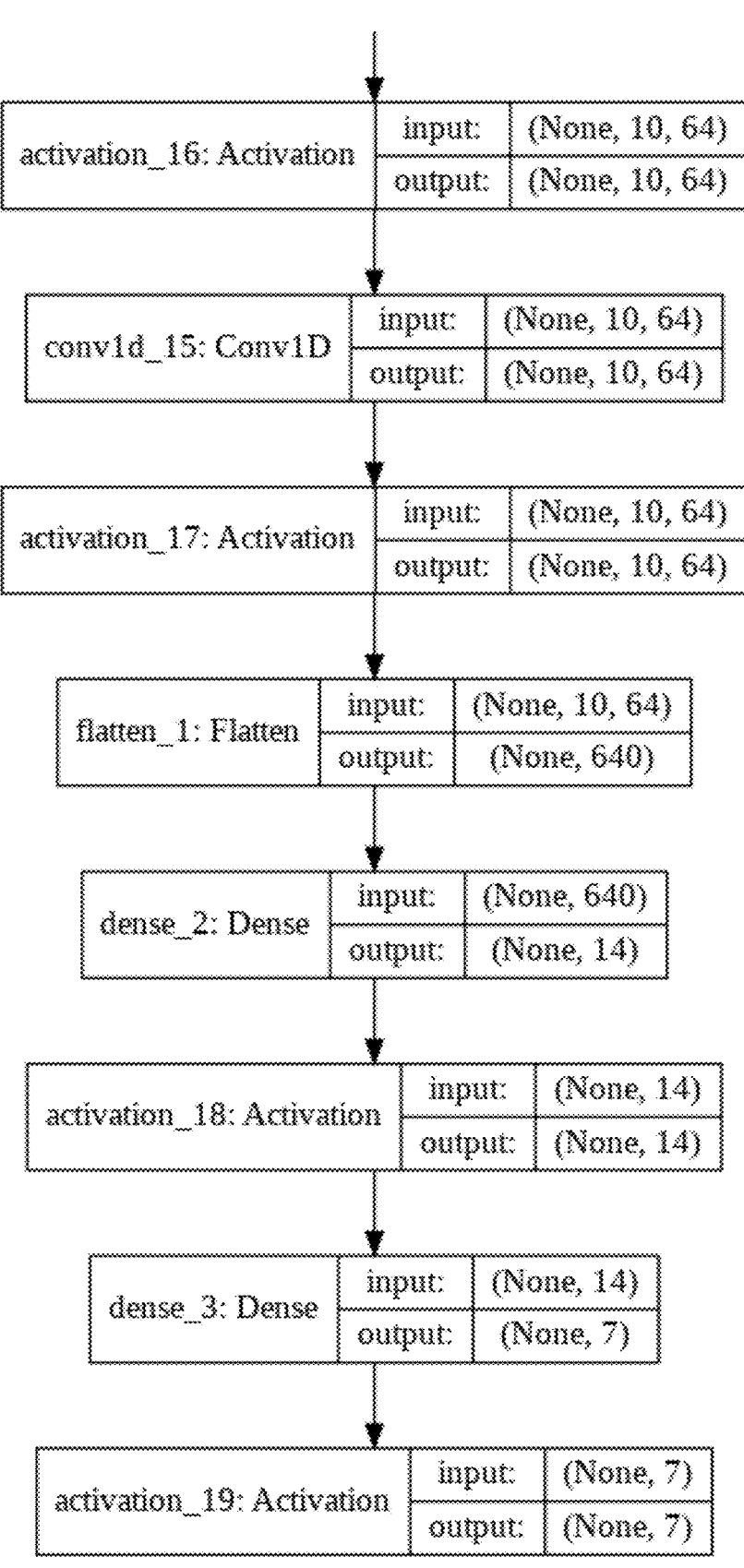
Figure 7:
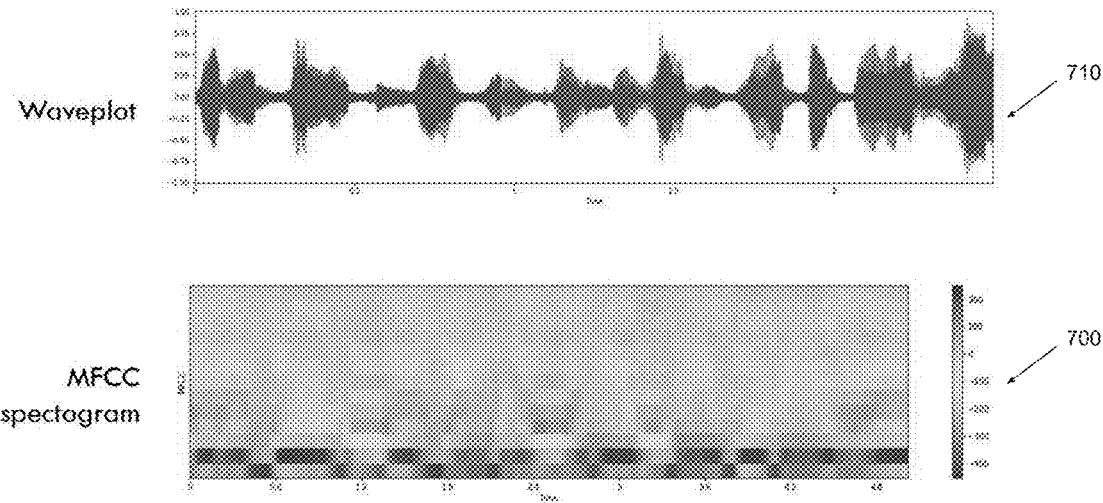
FIG. 7 is a more detailed image of the MFCC diagram in FIG. 5, coupled with a corresponding analog speech input waveform.

FIG. 6 is a graphical representation of one embodiment of the neural network architecture, implemented as a convolutional neural network, defining the machine learning model associated with the product. This is an example of one of the models used to classify the sentiment of speech once the audio has been preprocessed. Included in this convolutional neural network architecture are:

one-dimensional convolutional layers configured to recognize patterns, flatten layers to linearly alter data sizes pooling layers to reduce dimensionality, dropout layers to reduce data overfitting, activation layers to transform data into useful numbers, batch normalization layers to stabilize and standardize data, and dense layers to reduce the number of data channels.

Together, this combination of layers shown in the figures is trained on classified input data to generate the mathematical weights and biases stored in the proprietary trained neural network of the same structure. When the software is utilized, new input data is run through this trained neural network to classify emotions. It will be appreciated that the various implementations of the layers mentioned above is by way of example only. Other layer implementations can be used to achieve the same purpose of reducing dimensionality, reducing overfitting, etc. For example, linear alteration of the data size, dimensionality reduction, and/or reduction in the number of data channels could be achieved using rescaling, reshaping, or attention layers etc. Reduction in data overfitting could be achieved using grid search, activity regularization, or LASSO layers, etc. Data transformation into useful numbers could be achieved using regularization, encoding, or discretization layers, etc. Stabilizing and standardizing data could be achieved using average, masking, or maximum/minimum layers, etc.

As mentioned above, and as illustrated in FIG. 5, input audio is read in as a .wav file and then transformed into a Mel Spectrogram, and possibly further into MFCCs. These MFCCs represent the average change in pitch over time according to the Mel frequency scale, which relates a human's perceived frequency of a tone to the actual frequency of the tone in an effort to better reflect pitch changes that humans can hear. In order to process into MFCCs, the snippets of audio signal are each broken up into overlapping frames or time bands, and each frame is processed in a series of steps, including a Fourier transform, Mel filters, logarithmic reductions, and followed by another Fourier transform. After the final transform, the output is the spectral bands seen in the diagram 500 of FIG. 5. These bands show frequency abundance at a given time. To reduce the dimensionality of these coefficients to a time series, the mean of each time band is taken, as discussed further below, and subsequently fed into the neural network for classification.

Referring to FIG. 5, each vertical column in the MFCC diagram 500 represents a time band or frame, and each row represents a change in the pitch during the time band. The MFCC diagram is shown more clearly in FIG. 7 as diagram 700, corresponding to the analog speech input waveform 710. In the case of MFCCs, these pitch changes for the various time bands can be represented by a two-dimensional matrix 502. In order to make processed files more comparable, the present invention performs mean normalization on the matrix 502, as defined by the discussion in step 504. In this embodiment, the mean normalization reduces the size of the number to range between −2 and +2 (as shown in the matrix 506) rather than the previous −30 to +30 range of matrix 502. Thereafter, in order to achieve a dimensionality reduction from a two-dimensional to a one-dimensional matrix, a mean of each time band is taken as discussed in step 508. The result is the one-dimensional matrix 510.

Figure 8:
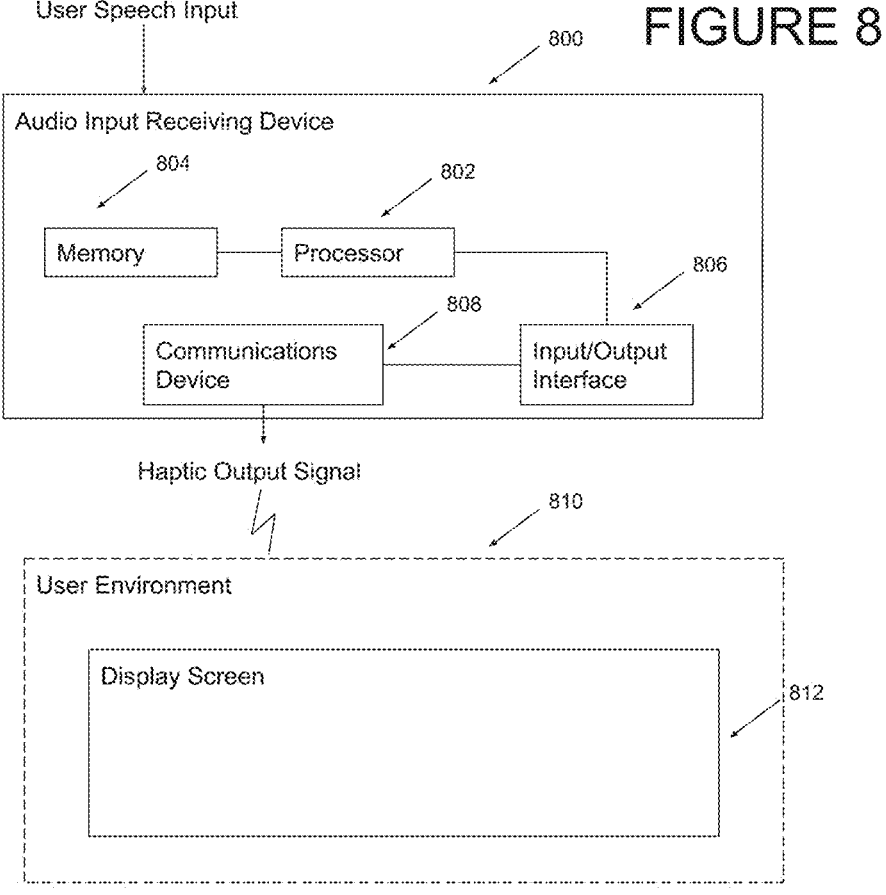
FIG. 8 is a block diagram of one embodiment of a system of the invention.

One implementation of a system of the present invention is shown in FIG. 8. The system includes an audio input receiving device 800, which includes a microphone (not shown), the output of which is typically converted from analog to digital form, e.g., using an A/D converter. The digital signal is fed into a processor 802, which is connected to a memory 804, and includes an I/O interface 806, which is in turn connected to a communications device 808. The digital output signal from the communications device 808, which represents at least one emotion derived from the audio input, is transmitted to the user environment 810 which associates the emotion with an icon or graphic depiction of the emotion, or provides a written description of the emotion. The user environment 810, in this embodiment, includes a display screen 812 for displaying the visual feedback. In another embodiment, instead of a visual feedback or in addition thereto, the users may each receive audio feedback on the emotional content of each speaker's audio input in real time.

Figure 9:
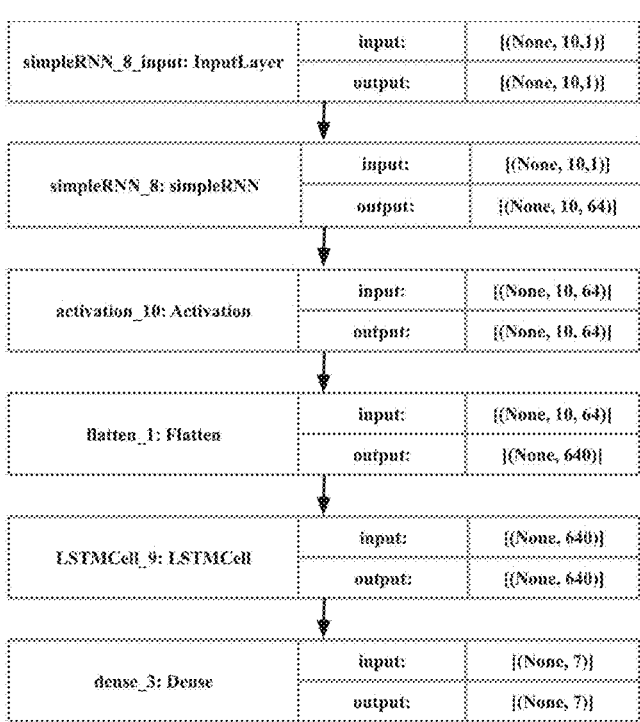
FIG. 9 shows another embodiment of a neural network architecture including the machine learning model built into the product.

While the above embodiment made use of a convolutional neural network (CNN) for the machine learning model, another implementation makes use of a recurrent neural network (RNN). FIG. 9 is a graphical representation of a neural network architecture implemented as recurrent neural network, defining the machine learning model associated with the product. This is another example of one of the main models used to classify the sentiment of speech once the audio has been preprocessed. Included in this recurrent neural network architecture are:

simple RNN layers configured to recognize patterns, flatten layers to linearly alter data sizes, activation layers to transform data into useful numbers.

dense layers to reduce the number of data channels, and long short-term memory layers to recurrently recognize patterns in series by using feedback connections and cell states.

Again, it will be appreciated that the various functions of the RNN can be implemented using different layers. For example, linear alteration of the data size, dimensionality reduction, and/or reduction in the number of data channels could be achieved using rescaling, reshaping or, attention layers, etc. Data transformation into useful numbers could be achieved using regularization, encoding or, discretization layers, etc. Recurrent recognition of patterns in series using feedback connections and cell states could be achieved using convolutional LSTM layers, gated recurrent units, or, stacked recurrent layers, etc.

Together, this combination of layers is trained on classified input data to generate the mathematical weights and biases stored in the proprietary trained neural network of the same structure. When the software is utilized, new input data is run through this trained neural network to classify emotions.

The processor may include a microprocessor or other device capable of being programmed or configured to perform computations and instruction processing in accordance with the disclosure. Such other devices may include microcontrollers, digital signal processors (DSP), Complex Programmable Logic Device (CPLD), Field Programmable Gate Arrays (FPGA), application-specific integrated circuits (ASIC), discrete gate logic, and/or other integrated circuits, hardware or firmware in lieu of or in addition to a microprocessor.

Functions and process steps described herein may be performed using programmed computer devices and related hardware, peripherals, equipment and networks. Such programming may comprise operating systems, software applications, software modules, scripts, files, data, digital signal processors (DSP), application-specific integrated circuit (ASIC), discrete gate logic, or other hardware, firmware, or any conventional programmable software, collectively referred to herein as a module.

The computer programs (e.g., the operating system, pre-programming stage and neural network) are typically stored in a memory that includes the programmable software instructions that are executed by the processor. In particular, the programmable software instructions include a plurality of chronological operating steps that define a control logic algorithm for performing the intended functions of the present disclosure. Such software instructions may be written in a variety of computer program languages such as C++, C#, etc.

The memory, which enables storage of data in addition the computer programs, may include RAM, ROM, flash memory and any other form of readable and writable storage medium known in the art or hereafter developed. The memory may be a separate component or an integral part of another component such as processor.

Further, alternative software implementations including, but not limited to, distributed processing or component/object distributed processing, parallel processing, or virtual machine processing can be constructed to implement methods described herein.

The present specification describes components and functions that may be implemented according to particular standards and protocols (e.g., TCP/IP, UDP/IP, HTML, HTTP, etc.)

In a non-limiting exemplary embodiment, a microphone may be used to capture verbal input signals, and the system may include a user interface e.g., a keyboard, mouse, etc.

While the disclosure has been described with respect to certain specific embodiment(s), it will be appreciated that many modifications and changes may be made by those skilled in the art without departing from the spirit of the disclosure. It is intended, therefore, by the description hereinabove to cover all such modifications and changes as fall within the true spirit and scope of the disclosure. In particular, with respect to the above description, it is to be realized that the optimum dimensional relationships for the parts of the exemplary embodiment(s) may include variations in size, materials, shape, form, function and manner of operation.

What is claimed is:

1. A method of analyzing spoken audio input for emotional content, comprising capturing a time series of the spoken audio input and defining time bands in the audio input, pre-processing the time series of the spoken audio input to generate a multi-dimensional Mel Spectrogram, or Mel-Frequency Cepstral Coefficient (MFCC) matrix, reducing the multi-dimensionality of the Mel Spectrogram or MFCC matrix to a single-dimension matrix output by taking the mean value for each time band as well as running mean normalization across all the data to define the single-dimension matrix output, feeding the single-dimension matrix output from the pre-processing into a trained neural network, which provides an output that identifies at least one emotion in the audio input, and presenting the emotion visually on a display screen in the form of a written description or graphic depiction.

2. A method of claim 1, wherein the audio input comprises an analog input or a digital input configured to define a pre-defined number of frequency values.

3. A method of claim 1, further comprising representing the emotional content of each speaker in auditory form.

4. A method of claim 1, wherein the artificial neural network comprises a recurrent neural network (RNN) that includes layers for performing one or more of the following steps:

transforming data into useful numbers, and reducing data overfitting.

5. A system for analyzing emotions in speech, comprising a verbal input receiving device for receiving a spoken input signal, a processor and memory configured with machine readable code to define a pre-processing stage, wherein the pre-processing stage is configured to generate a multi-dimensional Mel Spectrogram or Mel-Frequency Cepstral Coefficient (MFCC) matrix from time bands defined in the spoken input signal, and wherein the pre-processing stage takes the mean value for each time band as well as running mean normalization across all the data to define a single dimensional output, the system further comprising an emotion model in the form of a trained multi-layered neural network arranged to receive as its input, the single dimensional output from the pre-processing stage, wherein the neural network is configured either as a convolutional neural network or as a recurrent neural network, and provides as its output, data defining one more emotions in the speech.

6. A system of claim 5, wherein the neural network comprises a recurrent neural network with layers to transform data into useful numbers, and layers to reduce data overfitting.

7. A system for analyzing spoken audio input from one or more participants, for emotional content, comprising a pre-processing stage configured to generate a multi-dimensional Mel Spectrogram or-Mel-Frequency Cepstral Coefficient (MFCC) matrix from time bands defined in the spoken audio input, wherein the pre-processing stage takes the mean value for each time band as well as running mean normalization across all the data to define a single-dimensional output, a trained convolutional neural network (CNN) or a trained recurrent neural network (RNN), arranged to receive as its input the single-dimensional output from the pre-processing stage, and configured to identify at its output at least one emotion in the audio input, the system further comprising one or more display screens for representing the at least one emotion from the output of the CNN or RNN in visual form to one or more participants by means of one or more of written description, and graphic representation.

8. A system of claim 7, wherein the participants are speakers taking part in a telephone or online conversation.

9. A system of claim 7, further comprising an audio output for representing the at least one emotion in auditory form to a participant.

10. A system of claim 7, wherein the system is part of an online conference call network and the participants are connected to the network by means of user access devices.

11. A system of claim 10, wherein the user access devices include one or more of cell phone, tablet, laptop, or desktop computer.

12. A method of analyzing spoken audio input obtained from one or more speaking participants for emotional content, comprising capturing time bands of the spoken audio input, processing the time bands of the spoken audio input by transforming the time bands into a multi-dimensional Mel Spectrogram or Mel-Frequency Cepstral Coefficient (MFCC) matrix, and reducing the multi-dimensional matrix from the Mel Spectrogram or MFCC matrix to a single-dimensional matrix output by taking the mean value for each time band as well as running mean normalization across all the data to define the single-dimensional output, the method further comprising, feeding the single-dimensional output into a trained neural network, wherein the trained neural network comprises either a convolutional neural network (CNN) or a recurrent neural network (RNN), wherein the output from the CNN or RNN defines one or more emotions in the spoken audio input, and presenting the one or more emotions visually on one or more display screens by means of one or more of written description, and graphic representation, or by presenting the emotions of one or more of the participants by way of verbal feedback to one or more of the participants.

13. A system of claim 12, wherein, in the case of a Recurrent Neural Network architecture (RNN), the RNN includes one or more of:

layers to transform data into useful numbers, and layers to reduce data overfitting.

* * * * *